(12) United States Patent
Rundle

(10) Patent No.: US 11,490,462 B2
(45) Date of Patent: Nov. 1, 2022

(54) GROOVED FLOOR UNDERLAYMENT FOR RADIANT HEAT

(71) Applicant: Cory Rundle, Kingsport, TN (US)

(72) Inventor: Cory Rundle, Kingsport, TN (US)

(*) Notice: Subject to any disclaimer, the term of this patent is extended or adjusted under 35 U.S.C. 154(b) by 389 days.

(21) Appl. No.: 16/722,165

(22) Filed: Dec. 20, 2019

(65) Prior Publication Data
US 2020/0205236 A1 Jun. 25, 2020

Related U.S. Application Data

(60) Provisional application No. 62/782,432, filed on Dec. 20, 2018.

(51) Int. Cl.
*H05B 3/34* (2006.01)

(52) U.S. Cl.
CPC ......... *H05B 3/34* (2013.01); *H05B 2203/026* (2013.01); *H05B 2203/032* (2013.01)

(58) Field of Classification Search
CPC . H05B 3/34; H05B 3/56; H05B 3/267; H05B 2203/026; H05B 2203/032; H05B 2203/017
See application file for complete search history.

(56) References Cited

U.S. PATENT DOCUMENTS

| | | | |
|---|---|---|---|
| 2004/0004066 A1* | 1/2004 | Evans | E04D 13/103 219/201 |
| 2006/0151475 A1* | 7/2006 | Horvath | H05B 3/36 219/529 |
| 2010/0176118 A1* | 7/2010 | Lee | H05B 3/34 219/549 |

FOREIGN PATENT DOCUMENTS

CN 202581519 * 12/2012

OTHER PUBLICATIONS

WWW.JM.COM/GOBOARD, GoBoard Informational Brochure, 2019, 4 pages.
WWW.JM.COM/GOBOARD, GoBoard Quick Start Installation/ Technical Data Sheet, 2019, 2 pages.

* cited by examiner

*Primary Examiner* — Shawntina T Fuqua

(57) ABSTRACT

Disclosed is a floor underlayment system and method for radiant heat, comprising: one half inch tile or other floor underlayment board, a series of grooves cut into the tile or other floor underlayment board, electric resistance heating cable inserted into the series of grooves cut into the tile or other floor underlayment board, and sensor wires inserted into the series of grooves cut into the tile or other floor underlayment board.

7 Claims, 2 Drawing Sheets

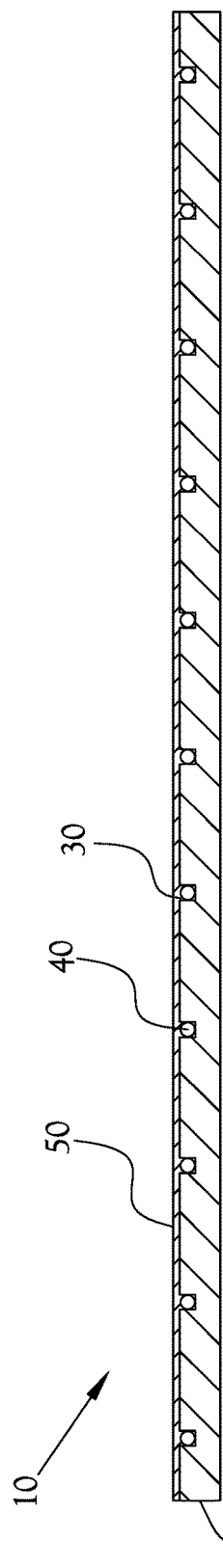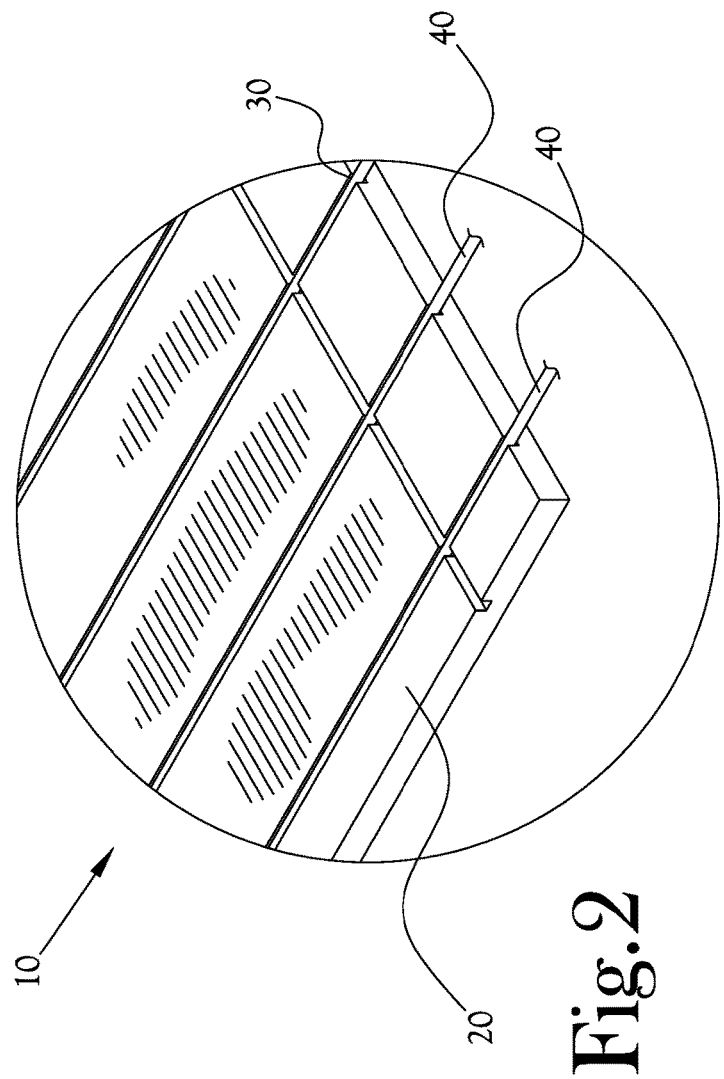
Fig.1
Fig.2

GROOVED FLOOR UNDERLAYMENT FOR RADIANT HEAT

CROSS-REFERENCE TO RELATED APPLICATIONS

This application claims the benefit of U.S. Provisional Application No. 62/782,432 filed on Dec. 20, 2018, the disclosure of which is hereby incorporated by reference herein in its entirety.

FIELD OF THE INVENTION

The present general inventive concept relates to a system and method for a tile floor underlayment board that is pre-grooved for accepting a spool of electric heating cable.

BACKGROUND

Prior art tile backer boards, such as the GoBoard® product from Johns Manville, have proven effective in providing a durable, lightweight, waterproof system for attaching a variety of floor tiles, particularly in locations where water damage is a concern, such as a bathroom or kitchen. One of the issues consumers have with tile floors though, is that these floors can be quite cold to the touch. Radiant heating systems have been used to provide heat in these situations. One prior art system provides a system for using grooves in a board and laying water lines for heat in the grooves. However, the electrical heating still has to be installed above the board with a layer of self-levelling material or thin set mortar in-between. It would be beneficial to use electrical resistance heating cable and cut grooves directly in a tile underlayment board, such as GoBoard.

BRIEF SUMMARY

Example embodiments of the present general inventive concept are directed to a system and method of laying floor underlayment for radiant heat, comprising: cutting one or more tile backer boards to dimensions of a work area; marking adjacent sides of the tile backer boards to remember the placement of the boards once the boards are taken up; starting near a thermostat location, marking connecting rows which are spaced 3 inches apart with a first colored marker for heating areas; providing a heat sensor and sensor wire; marking a placement of the heat sensor wire with a second colored marker, making note not to cross over any other wires; providing a length of electrical heating cable; determining the length of electrical heating cable required for the floor underlayment system installation; cutting ⅛ inches wide by 3/16 inches deep grooves into the tile backer boards with a router for the electrical heating cables and sensor wire; using a chisel to notch a deeper groove for a lead wire and to create a pocket for the heat sensor; fastening the tile backer boards to a subfloor with thin-set mortar using a ¼ inch by ¼ inch trowel and securing each tile backer board to the subfloor every 6 inches with 1⅝ inch screws; using ⅛ inch spacers to line up the grooves in the tile backer boards and space the boards; feeding the heating cable and the sensor wires into the grooves in the tile backer boards; sealing seams in the tile backer boards with a polyurethane sealant; attaching a monitor alarm to the floor underlayment system; skim coating over the cables with mortar; and installing floor tiles over the tile backer boards and skim coating surface with tile mortar.

Additional embodiments of the present general inventive concept are directed to a system and method of laying floor underlayment for radiant heat, comprising: dry laying one or more pre-grooved tile backer boards into pre-planned areas in a work space; using 4-way spacers to line up grooves in the pre-grooved tile backer boards and allowing ⅛" space between the pre-grooved tile backer boards; filling in remaining spaces in the work space with the pre-grooved tile backer boards; thin setting all the pre-grooved tile backer boards to a subfloor with thin mortar using a ¼"×¼" trowel, making sure to key in the thinset with the flat section of the towel; maintaining a consistent trowel pattern for the work space; fastening the tile backer boards every 6" with 1¼ tile backer board screws or other fasteners; laying heating cable in grooves in the pre-grooved tile backer boards; using a cutting tool to adjust or create new grooves for extra cable; laying cable at least 2" apart and with bends no more than 90 degrees; connecting an installation monitor to an end of the heating cable; inserting 2 flooring sensor wires together between two heating cables at least 12" within the field of heat and within reach of a thermostat; using the cutting tool to make a new channel; notching out a 3"×3" pocket for the sensors; feeding a lead wire and 2 sensor wires to the thermostat box; reconnecting the installation monitor until tile installation is complete; skim coating all pre-grooved tile backer boards with thin set mortar to completely encapsulate the wires and fill in grooves; and waiting at least 20 minutes before proceeding with laying tile over the pre-grooved tile backer boards and skim coating surface.

BRIEF DESCRIPTION OF THE FIGURES

The following example embodiments are representative of example techniques and structures designed to carry out the objects of the present general inventive concept, but the present general inventive concept is not limited to these example embodiments. In the accompanying images, the sizes and relative sizes, shapes, and qualities of lines, entities, and regions may be exaggerated for clarity. A wide variety of additional embodiments will be more readily understood and appreciated through the following detailed description of the example embodiments, with reference to the accompanying images in which:

FIG. 1 is a side view of a grooved floor underlayment system according to example embodiments of the present general inventive concept;

FIG. 2 is a close up view of a grooved floor underlayment system according to example embodiments of the present general inventive concept.

DETAILED DESCRIPTION

Figure 3:
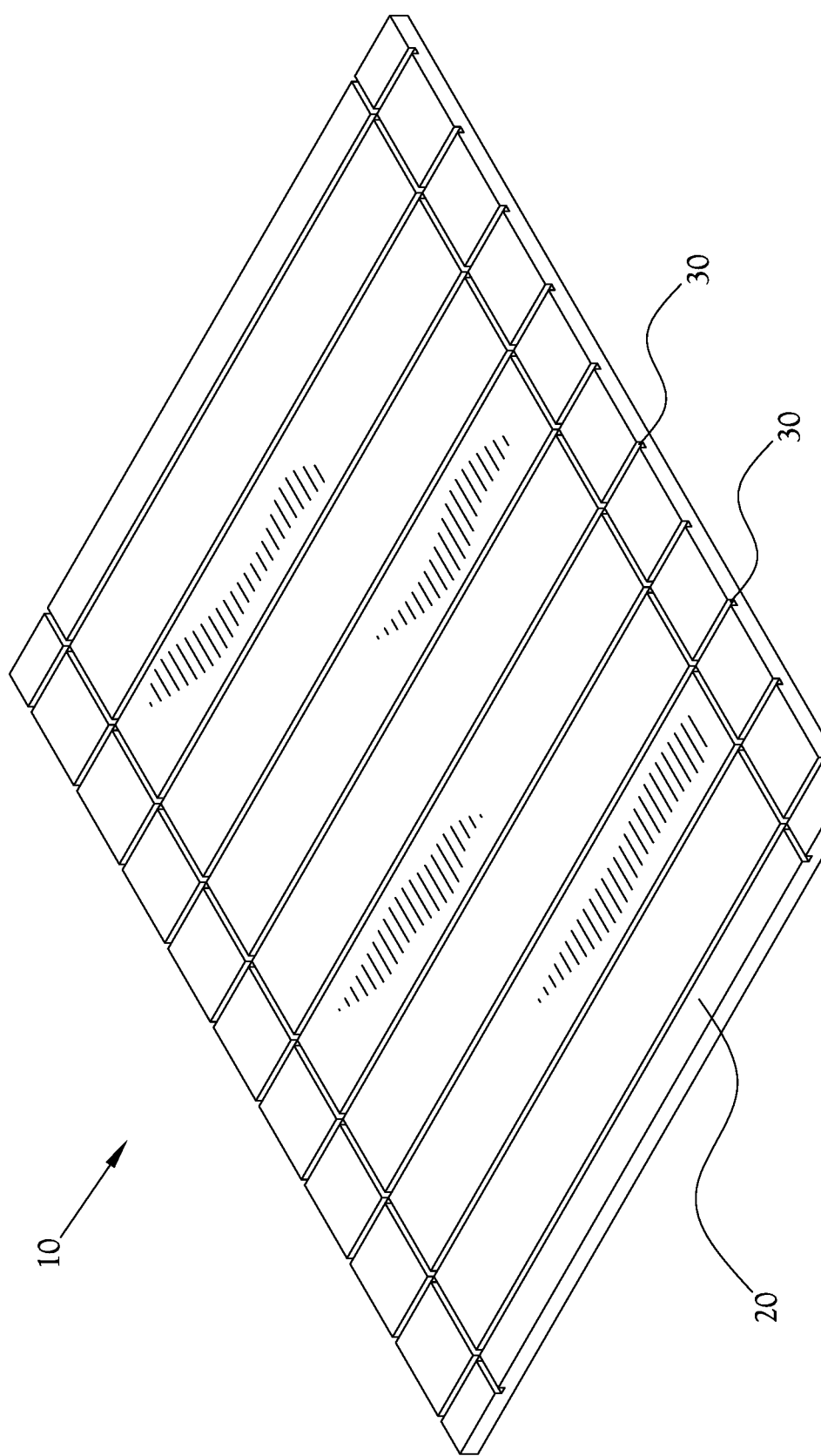
FIG. 3 is a perspective view of a grooved floor underlayment system according to example embodiments of the present general inventive concept.

Reference will now be made to the example embodiments of the present general inventive concept, examples of which are illustrated in the accompanying drawings and illustrations. The example embodiments are described herein in order to explain the present general inventive concept by referring to the figures.

In a typical heated floor installation, the heating cable has to heat all of the substrate which will result in substantial energy loss. Additionally, self-levelling material is required in order to encapsulate the heating cable. Multiple issues reside with using self-levelling material. Firstly, the materials don't level well without the use of a rake to break the surface tension. In instances where a heating wire is used, the rake will be problematic since it would snag and damage the wire. Additionally, typical self-levelling materials are liquid and utilize gravity to level. They can travel to undesirable areas of the room such as floor vents, subfloor seems, and under walls, and can create a substantially amount of damage, thereby increasing costs. Finally, it is problematic to use self-levelling materials with heating cable because the cable floats to the top and remains exposed. Staples can be used but these frequently can fail as well.

According to a first embodiment of the present general inventive concept, a floor underlayment system for radiant heat is disclosed. The tile backer board that may be used in the invention goes by the trade name GoBoard® and is manufactured by Johns Manville. Half inch thick tile backer board may be used, with dimension of 3 feet by 5 feet. The GoBoard has a compressive strength of 200 PSI, with a moisture movement less than 0.07% and favorable surface burning characteristics. The core material of the GoBoard is Polyisocyanurate. The current embodiment is not limited to the use of GoBoard, and other tile backer boards with physical characteristics similar to the ones described above may also be used.

Testing was performed on Heatboard, a floor underlayment heating system, using a mockup of a residential construction. An Advantech ¾ inch subfloor panel was attached to a 32 inch by 66 inch pallet using ceramic coated screws every 6 inches. A 3 foot stud wall was built next to the pallet with 16 inch on-center spacing. A thermostat was wired in with a plug-in power chord and electrical box with conduit according to code. Given the lack of heat conduction with Heatboard, three different groove designs were utilized to determine how well heating cable would transfer heat. In the first approach utilizing "wide grooves," 3 inch spacing with 3/16 inch deep and 3/16 inch wide grooves were cut in 5 rows. In a second approach using narrower grooves, 3 inch spacing with 3/16 inch deep and ¾ inch wide grooves were cut in 5 rows. Finally, 4 inch spacing with 3/16 inch deep and ¾ inch wide grooves were cut in 3 rows.

Traditional heating cable installations typically take approximately 2 hours to heat a cold floor to a comfortable temperature. The air temperature and the tile surface was 68 degrees Fahrenheit. The thermostat for the tile floor was set to 88 degrees Fahrenheit. The tile floor raised in temperature 1 degree every 2 minutes, and was warmed from 68 -degrees Fahrenheit to 88 degrees in 40 minutes. The two approaches with 3 inch spacing, as described in the disclosure above, both exhibited similar results, with the surface temperature at the cables at 88 degrees Fahrenheit and 86 degrees between the cables. The approach using 4 inch spacing appeared to be less favorable with 81 degrees to 71 degrees.

In one embodiment of the process steps, the user may cut ⅛ inch wide by 3/16 inch deep grooves into the tile backer board with a router or other tool. Electrical resistance heating cables may then be inserted into the grooves as well as standard sensor devices which are known in the art. For example, Warming Systems makes an affordable ⅛ inch diameter electrical resistance heating cables.

In an additional embodiment of the present general inventive concept, the user may cut a dry fit tile backer board to the dimensions of the work area. The user may letter adjacent sides in order to remember the placement once the boards are taken up. In a second step of the process, a red sharpie marker may be used to trace the areas where radiant heat is required. Starting near the thermostat location, a mark may be placed connecting rows spaced 3" apart. Next, using a different colored marker, a mark may be made showing the placement of the sensor wire. In one embodiment, the sensor wire should be between the heating cable and not crossover any other wires. In a third step of the process, the length of electrical heating cable may be determined which is required for the installation.

Next, the tile backer board may be taken up, for cutting the grooves. Using a router, ⅛" wide by 3/16" deep grooves may be cut for inserting the electrical heating cables and sensor wire. A chisel may be used to notch a deeper groove for the lead wire and to create a pocket for the sensor. Finally, the tile backer board may be reinstalled based on the previous lettering. The tile backer board may be installed with Ardex X5 mortar using ¼" by ¼" trowel and fasten every 6" with 1⅝" HardiBacker screws. ⅛" spacers may be used to line up the grooves and space the boards, and the approved heating cable and sensor wires fed into the grooves. If waterproofing is desired, the user may seal the seams with polyurethane sealant and wait 10 minutes before covering the seam. A Loud Mouth monitor alarm may be installed, then a skim coat applied over the cables with Ardex X5. Finally, the tile may be installed with Ardex X77 mortar.

In a second embodiment of the process steps, pre-grooved boards may be utilized by the customer. The installation method may then be as follows. First, pre-grooved boards may be dry laid in the preplanned areas. Then, 4-way spacers may be used to line up grooves and allow ⅛" space between boards, and remaining spaces may be filled in with ½" tile backer board. Thinset may be applied to all the boards to the substrate; for example, Ardex X5 or other mortar may be used, and the mortor may be applied with a ¼"×¼" trowel, preferably making sure to key in the thinset with the flat section of the trowel. The trowel pattern may be oriented in the same direction for optimum thinset coverage. The boards may be fastened every 6" with 1¼ tile backer board or other screws. In the next step, the heating cable may be laid in the grooves, and a cutting or other tool used to adjust or create new grooves for extra cable. Cable may be set at least 2" apart and bends preferably no more than 90 degrees. An installation monitor may be connected to the end of the heating cable lead. Next, 2 flooring sensor wires may be inserted together between two heating cables at least 12" within the field of heat and within reach of the thermostat. A cutting or other tool may be used to make a new channel, and a deep 3"×3" pocket notched out for the sensors. The lead wire and 2 sensor wires may be fed through the conduit to the thermostat box, and the installation monitor reconnected until tile installation is complete. All pre-grooved boards may be skim-coated with Ardex x5, or other mortar, in order to completely encapsulate the wires and fill in grooves. In one embodiment, the user will wait at least 20 minutes before proceeding with laying tile.

FIG. 1 shows an embodiment of the present general inventive concept, showing a side view of the floor underlayment system 10. In this view, the tile backer board 20 is shown with a series of grooves 30 cut into the top surface of the tile backer board 20. In the bottom image of FIG. 1 is shown a close-up view of the tile backer board 20 with a groove 30 and a heating cable 40 inserted into the groove 30. In the close-up view of FIG. 1, the heating cable 40 is enclosed within the groove 30, as would be the case when the thin set mortar 50 or other adhesive is used to secure the tiles to the tile backer board 20.

FIG. 2 shows a close-up view of the tile backer board 20 with the grooves 30 cut into the top surface of the tile backer board 20. The heating cable 40 is also shown enclosed within the grooves 30 cut into the top surface of the tile backer board 20. As pointed out above, the tile backer board 20 may be the GoBoard brand or other tile underlayment boards known in the art.

FIG. 3 shows a view of one embodiment of the present general inventive concept. A full view of the tile backer board 20 is shown with grooves 30 cut into the top surface of the tile backer board 20. The grid layout shown in FIG. 3 is based on the testing as described in the disclosure above. Although that design has proven effective in retaining heat in the finished tile floor, other layouts may also be possible in retaining heat.

It is noted that the simplified diagrams and drawings do not illustrate all the various connections and assemblies of the various components, however, those skilled in the art will understand how to implement such connections and assemblies, based on the illustrated components, figures, and descriptions provided herein. Accordingly, while the present general inventive concept has been illustrated by description of several example embodiments, it is not the intention of the applicant to restrict or in any way limit the scope of the inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings.

The invention claimed is:

1. A floor underlayment system for providing radiant heat, said floor underlayment system comprising:
   an underlayment backer board, wherein said underlayment backer board has a rigid foam core that does not conduct heat thereby inhibiting distribution of heat to a substrate, and further wherein said underlayment backer board is provided with a series of grooves cut into the underlayment backer board;
   a selected length of electric resistance heating cable inserted into the series of grooves cut into the rigid foam core underlayment backer board; and
   sensor wires inserted into the series of grooves cut into said rigid foam core underlayment backer board and a heat sensor in communication with said sensor wires, wherein said grooves are filled with a selected mortar for encapsulating said heating cable and said sensor wires.

2. The floor underlayment system of claim 1, wherein said rigid foam core of said underlayment backer board is a polyisocyanurate foam.

3. A method of laying a floor underlayment system for radiant heat, comprising:
   cutting one or more tile backer boards to dimensions of a work area;
   marking adjacent sides of the tile backer boards to remember the placement of the boards once the boards are taken up;
   starting near a thermostat location, marking connecting rows which are spaced 3 inches apart with a first colored marker for heating areas;
   providing a heat sensor and sensor wire;
   marking a placement of the heat sensor wire with a second colored marker, making note not to cross over any other wires;
   providing a length of electrical heating cable;
   determining the length of electrical heating cable required for the floor underlayment system installation;
   cutting ⅛ inches wide by 3/16 inches deep grooves into the tile backer boards with a router for the electrical heating cables and sensor wire;
   using a chisel to notch a deeper groove for a lead wire and to create a pocket for the heat sensor;
   fastening the tile backer boards to a subfloor with thin-set mortar using a ¼ inch by ¼ inch trowel and securing each tile backer board to the subfloor every 6 inches with 1⅝ inch screws;
   using ⅛ inch spacers to line up the grooves in the tile backer boards and space the boards;
   feeding the heating cable and the sensor wires into the grooves in the tile backer boards;
   sealing seams in the tile backer boards with a polyurethane sealant;
   attaching a monitor alarm to the floor underlayment system;
   skim coating over the cables with mortar; and
   installing floor tiles over the tile backer boards and skim coating surface with tile mortar.

4. A method of laying floor underlayment for radiant heat, comprising:
   dry laying one or more pre-grooved tile backer boards into pre-planned areas in a work space;
   using 4-way spacers to line up grooves in the pre-grooved tile backer boards and allowing ⅛" space between the pre-grooved tile backer boards;
   filling in remaining spaces in the work space with the pre-grooved tile backer boards;
   thin setting all the pre-grooved tile backer boards to a subfloor with thin mortar using a ¼"×¼" trowel, making sure to key in the thinset with the flat section of the towel;
   maintaining a consistent trowel pattern for the work space;
   fastening the tile backer boards every 6" with 1¼ tile backer board screws or other fasteners;
   laying heating cable in grooves in the pre-grooved tile backer boards;
   using a cutting tool to adjust or create new grooves for extra cable;
   laying cable at least 2" apart and with bends no more than 90 degrees;
   connecting an installation monitor to an end of the heating cable;
   inserting 2 flooring sensor wires together between two heating cables at least 12" within the field of heat and within reach of a thermostat;
   using the cutting tool to make a new channel;
   notching out a 3"×3" pocket for the sensors;
   feeding a lead wire and 2 sensor wires to the thermostat box;
   reconnecting the installation monitor until tile installation is complete;
   skim coating all pre-grooved tile backer boards with thin set mortar to completely encapsulate the wires and fill in grooves; and
   waiting at least 20 minutes before proceeding with laying tile over the pre-grooved tile backer boards and skim coating surface.

5. The floor underlayment system of claim 1, wherein said underlayment backer board has a compressive strength of 200 PSI and a moisture movement of less than 0.07%.

6. The floor underlayment system of claim 1, wherein said underlayment backer board is provided with a deeper groove defining a pocket in the underlayment backer board for receiving a heat sensor.

7. A method of laying a floor underlayment system for radiant heat, comprising:
  cutting at least one underlayment backer board to dimensions of a work area, wherein said at least one underlayment backer board has a rigid foam core that does not conduct heat thereby inhibiting distribution of heat to a substrate;
  providing a selected length of electrical heating cable;
  cutting grooves of a selected width and depth into the underlayment backer boards for receiving the electrical heating cables;
  feeding the heating cable into the grooves in the underlayment backer boards;
  skim coating over the cables with mortar thereby encapsulating said heating cables and filling said grooves; and
  sealing seams between adjoining underlayment backer boards with a polyurethane sealant.

* * * * *